Dec. 16, 1924.
B. M. BROWNELL
PIPE COUPLING
Filed June 4, 1923
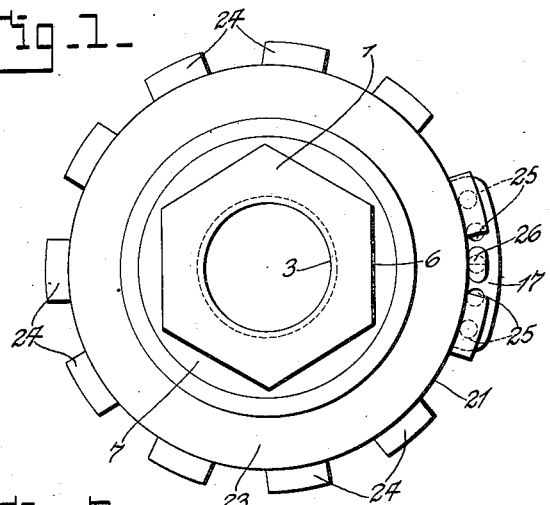
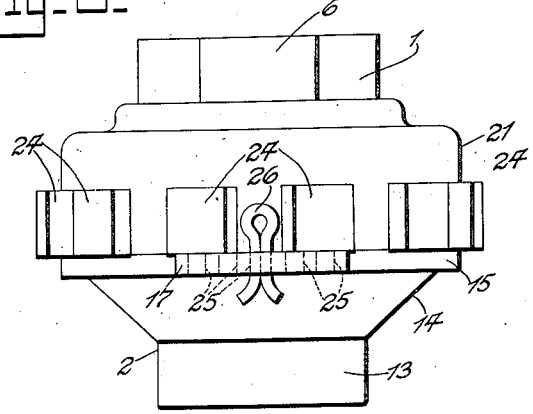
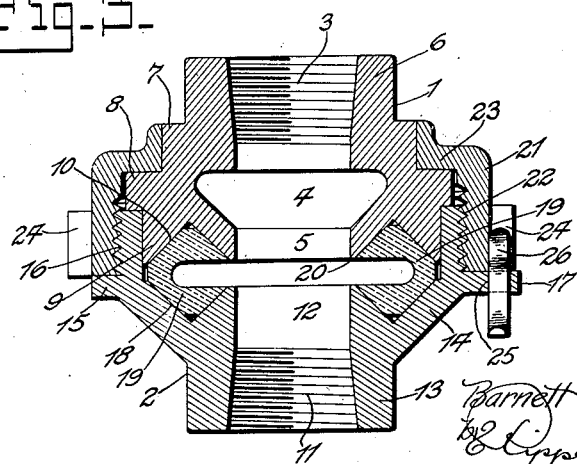
Inventor:
Barnett Morse Brownell,
by
His Attorneys.

Patented Dec. 16, 1924.

1,519,111

UNITED STATES PATENT OFFICE.

BARNETT MORSE BROWNELL, OF ST. LOUIS, MISSOURI, ASSIGNOR TO DIAMOND METAL PRODUCTS CO., OF ST. LOUIS, MISSOURI, A CORPORATION OF MISSOURI.

PIPE COUPLING.

Application filed June 4, 1923. Serial No. 643,221.

*To all whom it may concern:*

Be it known that I, BARNETT MORSE BROWNELL, a citizen of the United States, residing at St. Louis, Missouri, have invented a new and useful Pipe Coupling, of which the following is a specification.

This invention relates to improvements in pipe couplings, and consists in the novel construction hereinafter disclosed.

An object of the invention is to provide a coupling having relatively rotatable members that are connected by a seal member arranged to provide a tight joint and suitable for use in a steam, water, air or gas line and arranged so that the initial compression of the sealing member will be effective to seal the joint, said seal member being further arranged for expansion due to the pressure passing through the line.

Other features of the invention will be appreciated from the following detailed description thereof taken in connection with the accompanying drawing, in which—

Fig. 1 is a plan view.

Fig. 2 is an elevation.

Fig. 3 is a vertical section through the coupling.

In the embodiment of the invention illustrated in the drawing the coupling is shown as including coupling members 1 and 2, both members being formed from suitable castings, and said members including in detail the following features.

The member 1 includes a threaded throat 3 that develops into an enlarged opening 4 having a cylindrical throat 5, the threaded throat being adapted to receive an end pipe member of the pipe line. The upper portion of the member 3 is formed to provide a polygonal portion 6, an enlarged cylindrical portion 7, a flange 8, and a portion 9 reduced in diameter in respect of said flange 8. The polygonal portion 6 provides means for engaging the member 1 with a wrench or other instrument for tightening the member on to the section of the pipe line. The outer face of the wall 7 provides a bearing surface for the coupling, the flange 8 constituting an abutment for the end of the wall of the member 2, and the reduced portion 9 constituting a bearing surface against which a wall of the member 2 operates, all of which will appear more clearly from the description hereinafter.

The bottom face of the member 1 is formed with a channel 10, said channel preferably having diverging walls extending into the body of the casting member inwardly from the outer edges of the lower face thereof.

The member 2 includes a threaded throat 11 that develops into a cylindrical plane-faced opening 12 that registers with the passage 5 in the member 1. The threaded throat 11 is adapted to receive an end pipe member of the pipe line. The member 2 includes a lower cylindrical portion 13 and an enlarged portion 14 having outwardly inclined walls from the juncture with the portion 13 at the top of which portion 14 is an enlarged flange 15, and beyond the flange 15 is a reduced cylindrical exteriorly threaded portion 16. The flange 15 at one side is enlarged to provide a segment 17.

In the inner face of the member 2 and within the wall forming the portion 16 there is formed a channel 18 preferably having downwardly converging walls, said channel matching and forming with the channel 10 a seat for the gasket or sealing member 19 of the coupling. The gasket or sealing member of the coupling is annular in form and is preferably substantially rectangular in cross section, although the cross sectional form of the gasket may be varied so long as there is a substantial outer bearing surface for seating in the channels 10 and 18. Cut inwardly from the inner edge of the gasket is a substantially U-shaped channel 20 having its walls lying parallel and connected by a rounding surface at the base of the channel.

The gasket is made of flexible compressible material such, for instance, as semi-hard rubber or the like, and has sufficient body so that when it is seated between the coupling members and the coupling members are drawn together, it will be compressed sufficiently to force the sides of the gasket against the adjacent walls of the seat.

Heretofore great difficulty has been experienced in forming a tight joint where gaskets are used that are dependent entirely upon the pressure in the pipe line for forcing the walls of the gasket against the seat formed between the two coupling members. For instance, where the coupling is used on a steam and water line a gasket expandible by the pressure of the steam will form a tight joint, but when the line carries water at a reduced pressure there is not sufficient outward expansion of the gasket to seal the joint. It is one of the chief purposes of the present improvement to provide a formation of gasket and seat therefor so that sufficient initial compression may be given to the gasket to form a tight joint, regardless of the amount of pressure passing through the line. It is obvious that the present gasket also includes the characteristic of expansion where the pressure on the line increases as the pressure enters the channel 20 forcing the walls of the gasket radially against the contiguous walls of the seat for the gasket. Thus, as the pressure in the line increases, the outward pressure of the gasket against the walls of the seat likewise increases so that the seal is effective under all conditions of pressure in the line.

The two members 1 and 2 are coupled together by a threaded sleeve 21, said sleeve comprising an interiorly threaded cylindrical portion 22 that threads over the portion 16 of the member 2. The upper end of the portion 22 is extended inwardly forming a flange 23 that bears against the upper face of the flange 8 of the member 1, so that when the member 21 is screwed down into place over the threaded portion 16 of the member 2, the coupling member 1 is drawn down in clamped engagement with the member 2.

It will be noted that the flange 8 extends over the upper end of the wall of the portion 22, thereby forming an abutment determining the extent of clamping engagement between the two members. The parts are so designed that when drawn together the inside dimension of the seat for the gasket, comprising the channels 10 and 18, is slightly less than the normal dimension of the gasket in its expanded state, so that the gasket will be substantially compressed.

The member 21 is formed with a series of lugs 24 whereby it may be engaged by a spanner wrench in manipulating the sleeve for clamping the members together. The segment 17 is provided with a series of openings 25 therein and after the sleeve has been tightened for connecting the two coupling members, it may be locked by a cotter pin 26 interposed between adjacent ones of the lugs 24, said cotter pin being seated in an appropriate opening in the segment 17.

From the foregoing it is obvious that when the parts are assembled the seal between the coupling members, provided by the mechanical compression of the gasket, will be sufficient to expand the pressure of fluid or gas passing through the line; and that when the pressure passes through the line it will enter the channel 20, and that when pressure is increased in the line the effectiveness of the seal will be increased to withstand the increased pressure because of the fact that the pressure entering the channel 20 expands the gasket proportionately to the increased pressure.

I am aware that the invention may be modified in various particulars without departing from the spirit and scope of the invention. I do not limit myself unessentially, but what I claim and desire to secure by Letters Patent is:—

1. In a pipe coupling, the combination of a pair of coupling members mounted for swivel movement in respect of each other, said members having channels in their abutting faces, said channels forming a seat for a gasket, a gasket of expansible material interposed between said coupling members and seated in said channels and having a normal area in excess of the area of the seat when said coupling members are assembled whereby said gasket is compressed within said seat, and a threaded sleeve threaded on to one of said members and engaging the other of said members and holding said members in clamped relationship.

2. In a pipe coupling, the combination of a pair of coupling members being capable of swivel movement in respect of each other, said members having channels in their abutting faces, said channels forming a seat for a gasket, a gasket of expansible material interposed between said coupling members and seated in said channels and having a normal area in excess of the area of the seat when said coupling members are assembled whereby said gasket is compressed within said seat, a threaded sleeve threaded onto one of said members and engaging the other of said members and holding said members in clamped relationship, and means for locking said sleeve in clamped adjustment.

3. A pipe coupling comprising a pair of coupling members mounted for swivel movement having channels in their matching faces, said channels constituting a seat for a gasket and said members having overlapping portions at their matching ends, a gasket adapted to be mounted in the seat between said members, said gasket having a channel therein communicating with the interior of the coupling members and occupying a space in excess of the normal space formed by the channels in said members, and means for clamping said members together and thereby compressing said gasket.

4. A pipe coupling comprising a pair of coupling members having channels in their matching faces, said channels constituting a seat for a gasket and said members having overlapping portions at their matching ends, a gasket adapted to be mounted in the seat between said members, said gasket having a channel therein communicating with the interior of the coupling members and occupying a space in excess of the normal space formed by the channels in said members, means for clamping said members together and thereby compressing said gasket, and means for locking the clamping means after adjustment.

5. A pipe coupling comprising a pair of coupling members having channels in their matching faces, said channels constituting a seat for a gasket and said members having overlapping portions at their matching ends, a gasket adapted to be mounted in the seat between said members, said gasket having a channel therein communicating with the interior of the coupling members and occupying a space in excess of the normal space formed by the channels in said members, means for clamping said members together and thereby compressing said gasket, a threaded sleeve fitting over one of said members and threaded onto the other of said members for clamping said members together and thereby compressing said gasket, lugs supported by said sleeve, a segment having openings therein carried by one of said members, and a locking device adapted to seat in said openings and extend between said lugs to prevent displacement of said sleeve after it has been adjusted.

6. A pipe coupling comprising coupling members having openings through the axis thereof and having extensions adapted to fit within and overlap each other to form a telescope joint between said members, oppositely disposed walls formed within the matching faces of said members, said walls converging to provide a four walled seat for a gasket, a gasket of flexible expandible material, said gasket being substantially rectangular in cross section, arranged to seat within said seat and having a groove extending outwardly from the inner corner of said gasket, said groove being in communication with the openings in said members, and means for clamping said members together whereby the gasket is compressed within the seat.

7. A pipe coupling comprising coupling members having interfitting cylindrical portions at their adjacent ends and having channels formed in opposite faces of the said members forming together a substantially rectangular seat for a gasket, and having diagonally opposite corners in axial alinement, a gasket having a substantially flexible expandible body portion, a recess extending inwardly into said body portion, said recess being in communication with the axial openings in said members, a connecting sleeve connected to one of said members and engaging the other of said members for holding said members together in swivel relationship, and an abutment on one of said members to limit the adjustment of the matching faces of said members.

8. A pipe coupling comprising coupling members having interfitting cylindrical portions at their adjacent ends and having channels formed in opposite faces of the said members forming together a substantially rectangular seat for a gasket and having diagonally opposite corners in axial alinement, a gasket having a substantially flexible expandible body portion, a recess extending inwardly into said body portion, said recess being in communication with the axial openings in said members, a connecting sleeve connected to one of said members and engaging the other of said members for holding said members together in swivel relationship, an abutment on one of said members to limit the adjustment of the matching faces of said members, and means for locking said sleeve after the coupling has been adjusted in assembled relationship.

9. In a pipe coupling, the combination of a pair of interfitting coupling members, each of said members having a V-shaped channel in the adjacent walls thereof, a gasket having a cross dimension in excess of the greatest cross dimension of the recess formed by said matching channels, and a clamping member for connecting the coupling members together and compressing the gasket within the recess.

10. In a pipe coupling, the combination of a pair of interfitting coupling members arranged for swivel movement in respect of each other, each of said members having a polygonal walled channel in its abutting face, a gasket of normally expansible material having a cross section conforming to the cross section of the recess formed by the channels in the coupling members and being of an area in excess of the area of said recess, said gasket having a channel formed therein communicating with the coupling members and adapted to receive pressure passing through the coupling whereby the same is expanded coordinately with the amount of pressure passing through the coupling.

11. A pipe coupling, comprising in combination a pair of coupling members arranged for swivel movement in respect of each other, V-shaped grooves formed in the opposing faces of said members and constituting a substantially rectangular seat for a gasket, and a gasket of expansible material seated in said seat and having a groove extending outwardly from its inner corner toward the diametrically opposite corner for a distance beyond an axial line passing through the vertical corners of the gasket for the reception of pressure from the interior of the coupling whereby said gasket is expanded to seal the joint between said coupling members.

BARNETT MORSE BROWNELL.